(12) United States Patent
Nishino et al.

(10) Patent No.: US 11,541,583 B2
(45) Date of Patent: Jan. 3, 2023

(54) INJECTION-MOLDED ARTICLE AND METHOD FOR MANUFACTURING SAME

(71) Applicant: Panasonic Intellectual Property Management Co., Ltd., Osaka (JP)

(72) Inventors: Shouma Nishino, Osaka (JP); Hideo Mine, Nara (JP); Masashi Hamabe, Osaka (JP); Masayoshi Imanishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 14 days.

(21) Appl. No.: 17/142,291

(22) Filed: Jan. 6, 2021

(65) Prior Publication Data

US 2021/0252755 A1 Aug. 19, 2021

(30) Foreign Application Priority Data

Feb. 13, 2020 (JP) .............................. JP2020-022735

(51) Int. Cl.
*B29C 45/16* (2006.01)
*B29C 45/00* (2006.01)
(Continued)

(52) U.S. Cl.
CPC ...... *B29C 45/1634* (2013.01); *B29C 45/0005* (2013.01); *B29C 45/1671* (2013.01);
(Continued)

(58) Field of Classification Search
CPC ............ B29C 45/0005; B29C 45/0046; B29C 45/14778; B29C 45/14786; B29C 45/1634; B29C 45/1671; B29C 2045/0049; B29C 2045/2714; B29C 2703/00; B29C 2995/0021; B29C 2045/0039; B29C 45/1418; B29C 45/14819;
(Continued)

(56) References Cited

U.S. PATENT DOCUMENTS 6,660,196 B1 12/2003 Iwase et al.
11,298,857 B1 * 4/2022 Ferriot ................ B29C 45/0001
(Continued)

FOREIGN PATENT DOCUMENTS

JP H0691708 A * 4/1994
JP 8-276464 10/1996
(Continued)

OTHER PUBLICATIONS

Machine translation of JP 2019-115989 via EPO (Year: 2019).*
(Continued)

*Primary Examiner* — Mark Ruthkosky
*Assistant Examiner* — Rebecca L Grusby
(74) *Attorney, Agent, or Firm* — Wenderoth, Lind & Ponack, L.L.P.

(57) ABSTRACT

This injection-molded article is an injection-molded article using a cellulosic fiber composite resin, including: a resin insert piece including a colorant or a cellulose fiber; a first region formed of the cellulosic fiber composite resin; and a second region formed along a weld line of the cellulosic fiber composite resin extending from the resin insert piece, in which the first region and the second region have different color tones.

8 Claims, 18 Drawing Sheets

(51) Int. Cl.
*B29K 201/00* (2006.01)
*B29K 703/00* (2006.01)
*B44F 9/02* (2006.01)

(52) U.S. Cl.
CPC ...... *B29K 2201/00* (2013.01); *B29K 2703/00* (2013.01); *B29K 2995/0021* (2013.01); *B44F 9/02* (2013.01)

(58) Field of Classification Search
CPC .. B29C 2045/14286; B29C 2045/1692; B29K 2023/12; B29K 2105/0032; B29K 2201/00; B29K 2601/00; B29K 2601/08; B29K 2601/12; B29K 2601/14; B29K 2601/18; B29K 2045/0039; B44F 9/02
USPC .............................................. 264/250, 279.1
See application file for complete search history.

(56) References Cited

U.S. PATENT DOCUMENTS

| | | | |
|---|---|---|---|
| 2009/0045541 A1* | 2/2009 | Lazano | B29C 45/372 74/552 |
| 2012/0313281 A1* | 12/2012 | Aravamudan | B29C 70/48 264/73 |
| 2020/0307029 A1* | 10/2020 | Kajiyama | B29B 13/08 |

FOREIGN PATENT DOCUMENTS

| | | | | |
|---|---|---|---|---|
| JP | 9-300397 | | 11/1997 | |
| JP | 11-348075 | | 12/1999 | |
| JP | 2000000845 A | * | 1/2000 | |
| JP | 2000084981 A | * | 3/2000 | ......... B29C 45/0046 |
| JP | 2001089578 A | * | 4/2001 | |
| JP | 2008-272943 | | 11/2008 | |
| JP | 2010131889 A | * | 6/2010 | |
| JP | 2019-115989 | | 7/2019 | |

OTHER PUBLICATIONS

Machine translation of JP 2000-084981 via EPO (Year: 2000).*
Machine translation of JP 2001-089578 via J-PlatPat (Year: 2001).*
Machine translation of JP 2010-131889 via EPO (Year: 2010).*
Machine translation of JP 2000-000845 via EPO (Year: 2000).*
Machine translation of JP H0691708 via EPO (Year: 1994).*

* cited by examiner

FIG. 4

(Table 1)

| Item | Concentration of injection resin cellulosic fiber | Resin temperature | Mold temperature | Filling | Linear pattern |
|---|---|---|---|---|---|
| Unit | wt% | °C | °C | - | - |
| Example 1 | 10 | 230 | 80 | A | A |
| Example 2 | 15 | 230 | 80 | A | A |
| Example 3 | 20 | 230 | 80 | A | A |
| Example 4 | 25 | 230 | 80 | A | A |
| Example 5 | 30 | 230 | 80 | A | A |
| Example 6 | 35 | 230 | 80 | A | A |
| Example 7 | 40 | 230 | 80 | A | A |
| Example 8 | 45 | 230 | 80 | A | A |
| Example 9 | 50 | 230 | 80 | A | A |
| Example 10 | 55 | 230 | 80 | A | A |
| Example 11 | 60 | 230 | 80 | A | A |
| Example 12 | 65 | 230 | 80 | A | A |
| Example 13 | 70 | 230 | 80 | A | A |
| Example 14 | 75 | 230 | 80 | A | A |
| Comparative example 1 | 80 | 230 | 80 | B | B |

FIG. 8

(Table 2)

| Item | Concentration of injection resin cellulosic fiber | Resin temperature | Mold temperature | Linear pattern |
|---|---|---|---|---|
| Unit | wt% | °C | °C | - |
| Example 15 | 10 | 230 | 80 | A |
| Example 16 | 15 | 230 | 80 | A |
| Example 17 | 20 | 230 | 80 | A |
| Example 18 | 25 | 230 | 80 | A |
| Example 19 | 30 | 230 | 80 | A |
| Example 20 | 35 | 230 | 80 | A |
| Example 21 | 40 | 230 | 80 | A |
| Example 22 | 45 | 230 | 80 | A |
| Example 23 | 50 | 230 | 80 | A |
| Example 24 | 55 | 230 | 80 | A |
| Example 25 | 60 | 230 | 80 | A |
| Example 26 | 65 | 230 | 80 | A |
| Example 27 | 70 | 230 | 80 | A |
| Example 28 | 75 | 230 | 80 | A |

(Table 3)

| Number | Example 29 | Example 30 | Example 31 |
|---|---|---|---|
| Piece position/ size |  |  |  |
| Appearance |  |  |  |
| Flow direction of wood grain | Relatively vertically | Diagonally to left | Diagonally to left |
| Line width | 3mm | 2.5mm | 1.5mm |

701

702

INJECTION-MOLDED ARTICLE AND METHOD FOR MANUFACTURING SAME

BACKGROUND

1. Technical Field

The present disclosure relates to an injection-molded article and a method for manufacturing the same. In particular, it relates to a wood-molded article and a method for manufacturing the same.

2. Description of the Related Art

As a conventional method for manufacturing a wood-molded article, for example, a method for obtaining wood grain by using a colorant to obtain color unevenness or contrasting density of color (marble molding or the like) is common.

However, although the color of the wood grain can be reproduced by the method described above, it is difficult to reproduce the tactile sensation, feeling, and texture due to fine irregularities on a surface, and there is a problem that the plastic feeling remains.

In response to the problems described above, the inventor of the present application has previously developed a method for reproducing color unevenness, contrasting density, and texture peculiar to wood in Japanese Patent Unexamined Publication No. 2019-115989. However, although the patent described above can reproduce color unevenness, contrasting density, and texture like natural wood, there is a need for further improvement of woody feeling. It was found that there are still issues to be solved in order to further improve the quality of woody feeling, and it is necessary to take measures for that.

As a method for reproducing the wood grain, the methods illustrated in Japanese Patent Unexamined Publication No. 8-276464 and Japanese Patent Unexamined Publication No. 11-348075 have been developed.

The two-headed injection device described in Japanese Patent Unexamined Publication No. 8-276464 is configured of two injection cylinders disposed side by side and two injection screws housed in the cylinders, and molten resin outlets at tips of the two cylinders merge to form one nozzle. As the wood material, wood powder from which harmful volatile substance is sufficiently dried and removed is used, wood powder is mixed with a plastic raw material, and two types of molding raw materials of A and B materials which have different wood ratios are prepared to fill each of the injection cylinders of the two-headed injection device. The wood ratio can be up to about 80%, and it is preferable to bring it as close to 80% as possible in order to obtain the woody feeling of natural wood. If necessary, the two types of molding raw materials are mixed with a coloring material, a pigment, a coloring ink, or the like to add color. Next, a molding method of the present disclosure using the two-headed injection molding machine will be described. First, a fixed mold and a moving mold of the two-headed injection molding machine are mold-clamped, a cavity in the mold is partially filled with a predetermined amount of the material A by one cylinder, and then partially filled with a predetermined amount of the material B by the other cylinder. Then, the injection described above is repeated alternately, and sufficient pressure is applied to cool in a final injection. A board grain pattern is formed by repeating the alternating injection of a predetermined amount of the material A and the material B. In this case, it is more desirable to keep the fixed mold and the moving mold appropriately warm.

In the method for manufacturing a wood grain injection-molded article described in Japanese Patent Unexamined Publication No. 11-348075, a reinforcing member is set in the cavity, while a molten resin is prepared which includes the first material and the second material having a color different from that of the first material in an incompletely mixed state, the molten resin is supplied into the cavity in which the reinforcing member is set with a plurality of flow-splits, the reinforcing member is cast with the molten resin to form a solidified layer, a second material solidified portion is formed in the solidified layer as a straight grain pattern at substantially regular intervals for each flow-split trace in a step of the molded article (product portion), based on an operation of the plurality of flow-splits of the molten resin.

SUMMARY

According to an aspect of the present disclosure, there is provided an injection-molded article containing a cellulosic fiber composite resin, the injection-molded article including: a resin insert piece including a colorant or a cellulose fiber; a first region formed of the cellulosic fiber composite resin; and a second region formed along a weld line of the cellulosic fiber composite resin extending from the resin insert piece, in which the first region and the second region have different color tones.

A method for manufacturing an injection-molded article according to one aspect of the present disclosure, including: a step of disposing a resin insert piece including a colorant or a cellulose fiber in a cavity between molds away from a gate; and a step of injection-molding a cellulosic fiber composite resin from the gate into the cavity to form a first region by the cellulosic fiber composite resin and a second region having a color tone different from that of the first region along a weld line of the cellulosic fiber composite resin extending from the resin insert piece.

BRIEF DESCRIPTION OF THE DRAWINGS

FIG. 4 is Table 1 illustrating manufacturing conditions and evaluation results thereof in a method for manufacturing an injection-molded article according to Embodiment 2;

FIG. 8 is Table 2 illustrating manufacturing conditions and evaluation results thereof in a method for manufacturing an injection-molded article according to Embodiment 4;

DETAILED DESCRIPTIONS

Figure 1A:
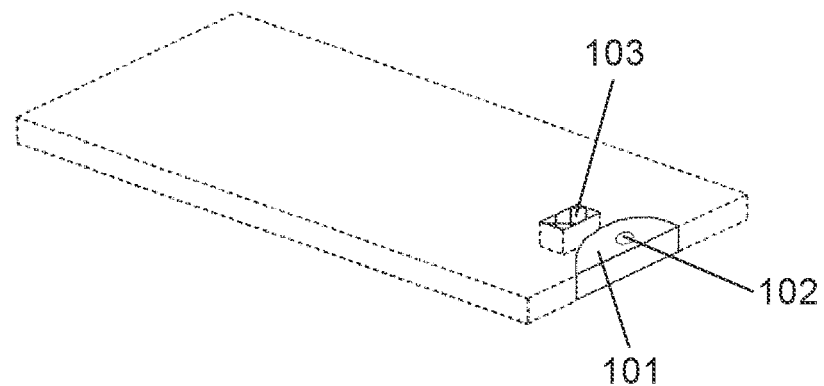
FIG. 1A is a schematic perspective view illustrating one step of a method for manufacturing an injection-molded article according to Embodiment 1.

The method described in Japanese Patent Unexamined Publication No. 8-276464 requires a special molding machine such as a two-color molding machine, and it is also necessary to prepare two types of materials having different wood component addition concentrations as materials for injection molding. Among the wood grain patterns, only the board grain pattern can be reproduced, and a high-grade straight grain pattern cannot be reproduced. There is a problem that it is difficult to reproduce color unevenness and color contrasting density peculiar to wood by adding a colorant.

The method described in Japanese Patent Unexamined Publication No. 11-348075 illustrates significant improvements such as reproduction of the straight grain pattern, which is a problem of Japanese Patent Unexamined Publication No. 8-276464, and can reproduce the straight grain pattern by a normal injection molding machine, but there are problems in that the number of gates increases with respect to the article, control of each of the straight grain patterns is difficult, and a width and a direction of the straight grain pattern cannot be optionally set.

The present disclosure is given to solve the conventional problems described above, and an object of the present disclosure is to provide an injection-molded article having various wood grain patterns.

An injection-molded article according to a first aspect is an injection-molded article containing a cellulosic fiber composite resin, including: a resin insert piece including a colorant or a cellulose fiber; a first region formed of the cellulosic fiber composite resin; and a second region formed along a weld line of the cellulosic fiber composite resin extending from the resin insert piece, in which the first region and the second region have different color tones.

In the injection-molded article according to a second aspect, in the first aspect, the second region may have a width narrower than a width of the first region and may have a continuous linear pattern.

In the injection-molded article according to a third aspect, in the first or second aspect, the weld line may contain a part of cellulosic fiber composite resin, in which a flow of the cellulosic fiber composite resin from a gate trace formed at a time of injection molding, is hindered by the resin insert piece to cause branching and merging.

In the injection-molded article according to a fourth aspect, in any one of the first to third aspects, the second region may be colored by a colorant.

In the injection-molded article according to a fifth aspect, in any one of the first to third aspects, the second region may include a cellulosic fiber.

In the injection-molded article according to a sixth aspect, in the fifth aspect, the second region may include a carbide of the cellulosic fiber.

In the injection-molded article according to a seventh aspect, in any one of the first to sixth aspects, the injection-molded article may include one gate trace formed at the time of injection molding and a plurality of resin insert pieces, and may have a plurality of the second regions extending from the plurality of resin insert pieces.

In the injection-molded article according to an eighth aspect, in any one of the first to sixth aspects, the injection-molded article may include a plurality of gate traces formed at the time of injection molding and a plurality of resin insert pieces, and may have a plurality of the second regions extending from the plurality of resin insert pieces, and a direction of the weld line forming the second region may be at least one of a direction along an injection direction of the cellulosic fiber composite resin and a merging direction of the cellulosic fiber composite resin from the plurality of gate traces.

A method for manufacturing an injection-molded article according to a ninth aspect includes a step of disposing a resin insert piece including a colorant or a cellulose fiber in a cavity between molds away from a gate; and a step of injection-molding a cellulosic fiber composite resin from the gate into the cavity to form a first region of the cellulosic fiber composite resin and a second region having a color tone different from that of the first region along a weld line of the cellulosic fiber composite resin extending from the resin insert piece.

The method for manufacturing an injection-molded article according to a tenth aspect, in the ninth aspect, the method may further include a step of treating the cellulosic fiber composite resin at a temperature of 180° C. or higher.

In the method for manufacturing an injection-molded article according to an eleventh aspect, in the ninth or tenth aspect, a mold temperature at the time of injection molding may be 20° C. to 100° C.

The method for manufacturing an injection-molded article according to a twelfth aspect, in any one of the ninth to eleventh aspects, in the step of disposing the resin insert piece, each resin insert piece including the colorant or the cellulose fiber may be disposed in the cavity between the molds away from each of a plurality of the gates, and in the step of injection-molding the cellulosic fiber composite resin to form the first region and the second region, the cellulosic fiber composite resin may be injected into the cavity between the molds from the plurality of gates, and the injected cellulose fiber composite resins may be merged from different directions at an angle to form the first region and the second region.

As described above, according to the injection-molded article according to the present disclosure, it is not necessary to use a special molding machine, and the linear wood grain pattern can be reproduced in any direction and thereby it is possible to provide a wood-molded article that is close to natural wood even more than the related art.

Hereinafter, the injection-molded article according to embodiments will be described with reference to the attached drawings. In the drawings, substantially the same members are designated by the same reference numerals.

EMBODIMENT 1

FIGS. 1A to 1D are schematic perspective views illustrating each step of a method for manufacturing an injection-molded article according to Embodiment 1. FIG. 2A is a schematic plan view illustrating how cellulosic fiber composite resin 101 from gate 102 branches on a front surface of resin insert piece 103 and wraps around a side surface thereof in Embodiment 1. FIG. 2B is a schematic plan view illustrating a mechanism in which the cellulosic fiber composite resin that wrapped around after FIG. 2A elutes and merges resin insert piece 103, and pattern 107 due to the eluted resin becomes linear.

Injection-Molded Article

Wood-molded article 100, which is the injection-molded article according to Embodiment 1, is an injection-molded article using cellulosic fiber composite resin 101. As illustrated in FIG. 1D, wood-molded article 100 has resin insert piece 103 including a colorant or a cellulosic fiber, first region formed of cellulosic fiber composite resin 101, and second region 107 formed along weld line 106 of cellulosic fiber composite resin 101 extending from resin insert piece 103. Color tones of first region formed of the cellulosic fiber composite resin 101 and second region 107 are different. Second region 107 has a linear pattern, for example, a linear wood grain pattern.

Method for Manufacturing Injection-Molded Article

In the method for manufacturing an injection-molded article according to Embodiment 1, for example, cellulosic fiber composite resin 101 to which 55% by mass of a cellulosic fiber is added is used for injection molding. An examination was carried out by using resin insert piece 103 which was molded by adding 3% by mass of a brown colorant to polypropylene, which is a base resin of a cellulosic fiber composite resin. Injection molding conditions in Embodiment 1 are, for example, a resin temperature of 190° C., a mold temperature of 60° C., an injection speed of 100 mm/s, and a holding pressure and holding time of 80 MPa and 5 s.

(1) Resin insert piece 103 including a colorant is disposed in a cavity between molds (not illustrated) away from gate 102.

Figure 2A:
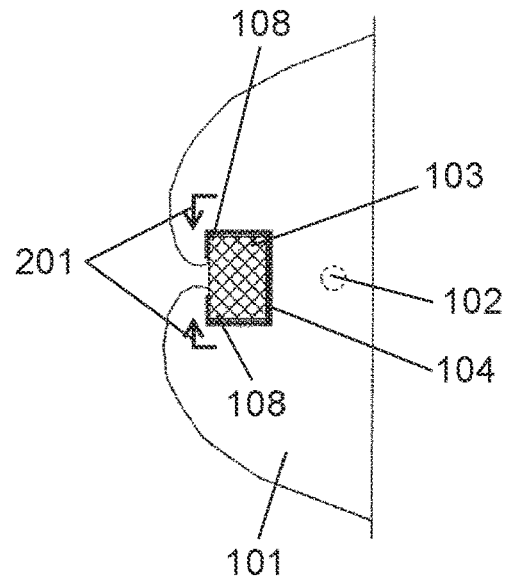
FIG. 2A is a schematic plan view illustrating how a cellulosic fiber composite resin from a gate branches on a front surface of a resin insert piece and wraps around a side surface thereof in Embodiment 1.
Figure 2B:
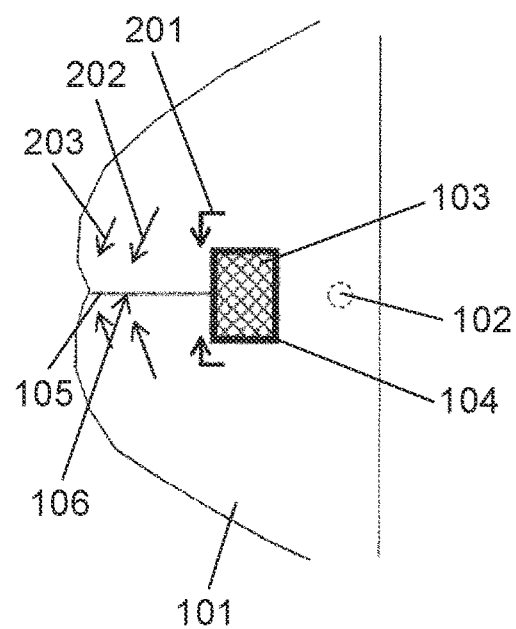
FIG. 2B is a schematic plan view illustrating a mechanism in which the cellulosic fiber composite resin that wrapped around after FIG. 2A elutes and merges the resin insert piece, and a pattern due to the eluted resin becomes linear.

(2) In FIG. 1A, cellulosic fiber composite resin 101 injected from a cylinder of a molding machine is injected into the cavity from gate 102 inside the mold.

Figure 1B:
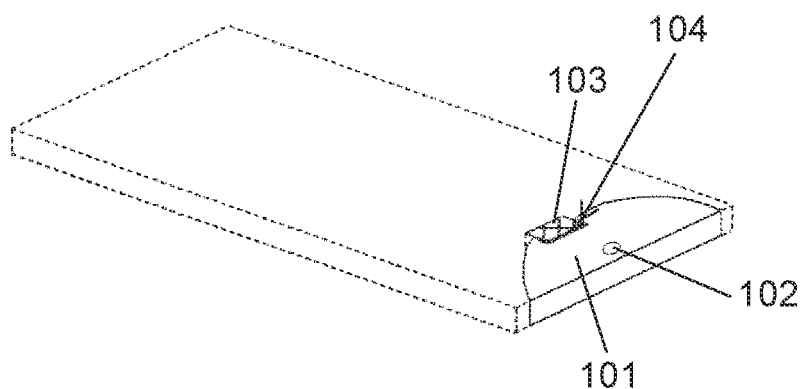
FIG. 1B is a schematic perspective view illustrating one step of the method for manufacturing an injection-molded article according to Embodiment 1.

(3) In FIG. 1B, resin insert piece 103 disposed at a position 5 mm from gate 102 is brought into a molten state by shear heat generation 104 by colliding with cellulosic fiber composite resin 101.

Figure 1C:
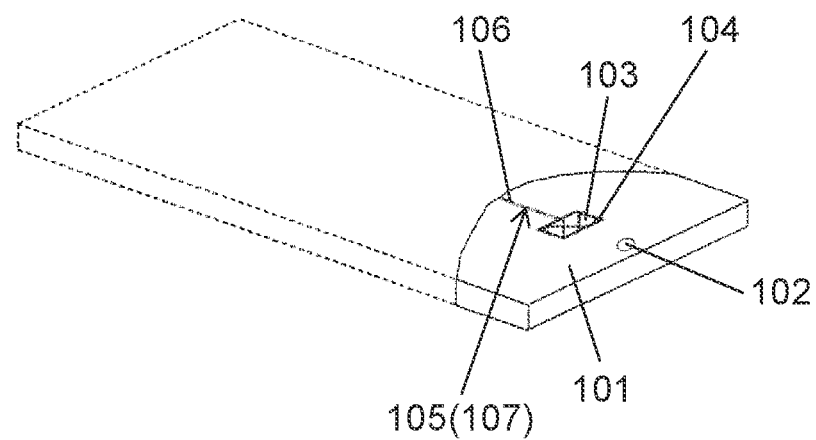
FIG. 1C is a schematic perspective view illustrating one step of the method for manufacturing an injection-molded article according to Embodiment 1.
Figure 1D:
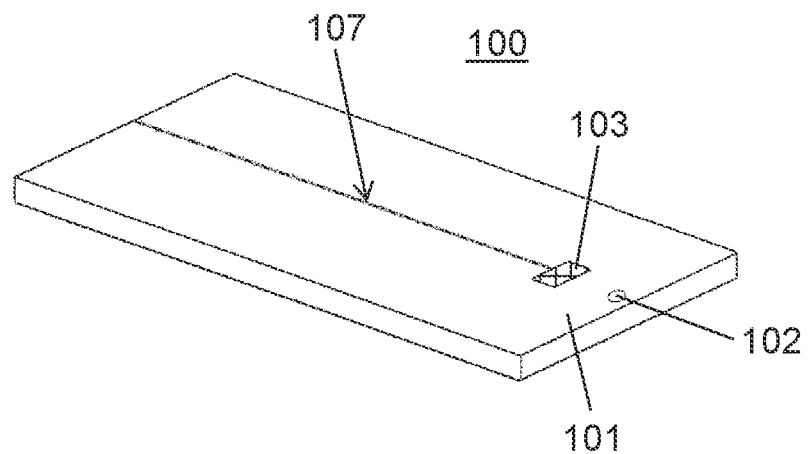
FIG. 1D is a schematic perspective view illustrating one step of the method for manufacturing an injection-molded article according to Embodiment 1.

(4) In FIG. 1C, cellulosic fiber composite resin 101 branches so as to avoid resin insert piece 103. Due to a shearing force at the time of this branching, the side wall of molten resin insert piece 103 elutes and flows out toward a flow end together with a resin flow. At this time, resin 105 that flowed out from resin insert piece 103 elutes along weld line 106 formed by cellulosic fiber composite resin 101 that merged after branching with resin insert piece 103.

(5) In FIG. 1D, cellulosic fiber composite resin 101 flows while forming weld line 106, and the cavity is filled therewith at the flow end. At this time, resin insert piece 103 disposed at the position 5 mm from gate 102 constantly generates shear heat generation 104. Therefore, by continuing to elute resin 105 that flowed out from the side surface of resin insert piece 103 until being filled to the flow end, linear pattern 107 is formed behind resin insert piece 103 in a flow direction.

As described above, wood-molded article 100 which is an injection-molded article having linear pattern 107 can be obtained.

In the method for manufacturing an injection-molded article, for example, the cellulosic fiber composite resin may be used, which includes 10% by mass or more of a fiber having an aspect ratio (fiber length/fiber diameter) of the cellulosic fiber of 5 or more to be added to the injection resin with respect to a base resin in which the fiber is a base material. This is because in a case where the aspect ratio is less than 5, a fiber shape approaches a powder-like shape, which reduces a reinforcing effect of the fiber and increases the brittleness. In a case where the addition rate of the cellulosic fiber is less than 10% by mass, the viscosity at the time of injection is low, and there is likely to occur an inconvenience that it is difficult to generate the shearing force and shear heat generation enough to elute the resin insert piece disposed in the mold.

In order to prevent complete carbonization of the cellulosic fiber, the cellulosic fiber composite resin is treated, for example, at a resin temperature of less than 260° C.

As the cellulosic fiber composite resin that can be used in the method for manufacturing an injection-molded article, for example, it is possible to include a cellulosic fiber composite resin obtained by pre-pulverizing bleached coniferous pulp extracted from wood to a diameter of about 50 μm and a length of about 250 μm, and mixing and kneading powdered pulp with, for example, polypropylene, which is a base material, in a kneader.

In a case where the raw material described above is used, a set temperature of the kneader can be, for example, 190° C. At this time, the pulp can be kneaded at a low temperature so as not to being discolored (brown) as much as possible. The shearing force generated in the kneader causes fiber defibration (unraveling the fiber to reduce the diameter), and the fiber aspect ratio (fiber length/fiber diameter) in a cellulosic fiber composite resin pellet after kneading can be increased compared with that of powdered pulp before kneading.

The type of the cellulosic fiber is not particularly limited, and any material such as softwood, hardwood, and bamboo that can extract the cellulosic fiber may be used. As described above, the fiber preferably has an average aspect ratio of 5 or more, and under that condition, the fiber can be freely selected in a range in which a diameter is μm order to nm order. The cellulosic fiber is preferably bleached and has a lignin component removed, and for example, bleached pulp may be used as a raw material such as paper.

In the method for manufacturing an injection-molded article described above, the resin insert piece is disposed near the gate in a mold structure. Therefore, the resin is eluted from the resin insert piece due to the shear heat generation and the shearing force generated by the collision between the injected cellulosic fiber composite resin and the resin insert piece. The outflowing resin flows out along the weld line formed when the cellulosic fiber composite resin collides with the insert piece, and the flow branches and merges to form a wood grain-like linear pattern.

Next, in the method for manufacturing an injection-molded article, a mechanism for obtaining the linear pattern will be described with reference to FIGS. 2A and 2B.

a) As illustrated in FIG. 2A, cellulosic fiber composite resin 101 injected from gate 102 collides with resin insert piece 103 and then flows around resin insert piece 103 with shear heat generation 104, and inward flow 201 is generated at corners 108 of resin insert piece 103.

b) As illustrated in FIG. 2B, cellulosic fiber composite resin 101 flowing around resin insert piece 103 merges, and after that, continuously receives inward forces 202 and 203 due to the influence of resin insert piece 103. As a result, resin 105 that flows out from resin insert piece 103 due to the shear heat generation 104 flows so as to be constrained on weld line 106, and remains in the molded article like a linear pattern. The weld line can be obtained, for example, by simulating a state of branching and merging of injected cellulosic fiber composite resin 101.

Figure 3:
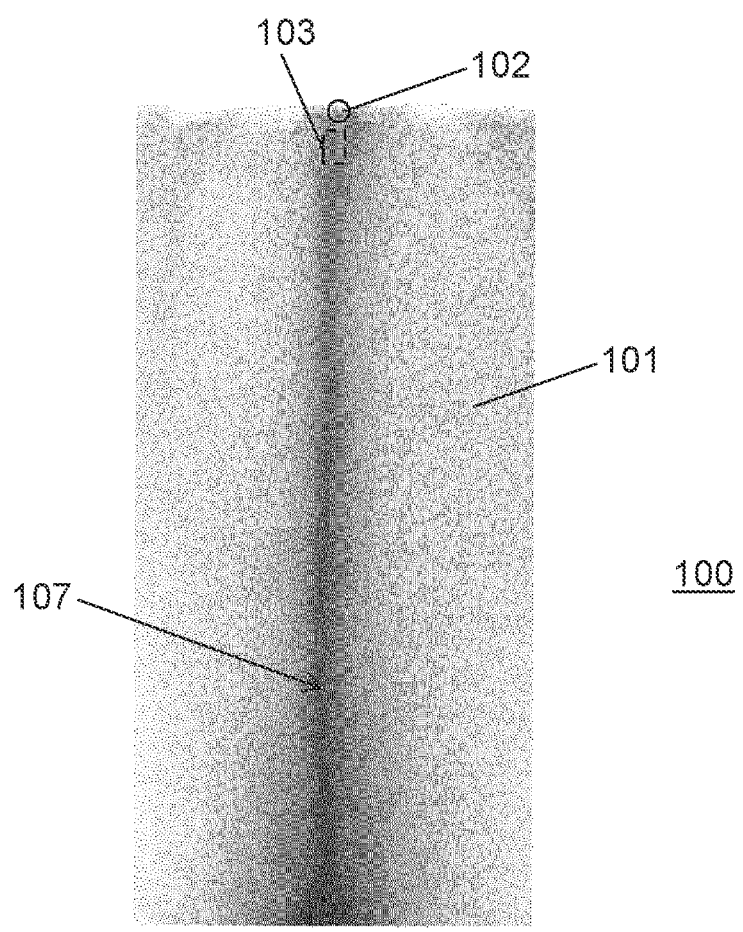
FIG. 3 is a schematic plan view illustrating an appearance of a molded article of a wood-molded article which is the injection-molded article of FIG. 1D.

As illustrated in FIG. 3, in wood-molded article 100 which is the injection-molded article of FIG. 1D, it can be confirmed that resin 105, which is eluted from polypropylene insert piece 103 which is colored brown in a part of cellulosic fiber composite resin 101 and flows out, flows to the flow end and linear pattern 107 is formed. Pattern 107 is linear pattern 107 which is basically linear style, but fluctuations occur in some places, and the texture is like a natural wood grain. A color difference between the polypropylene insert piece disposed in the mold and the linear pattern formed by flowing out from the polypropylene insert piece was calculated. Color difference ΔE representing a difference between the two colors in a Lab color display space can be obtained from the following equation.

$$\Delta E = \sqrt{(L_1^* - L_2^*)^2 + (a_1^* - a_2^*)^2 + (b_1^* - b_2^*)^2} = 0.33$$

From the results described above, color difference ΔE between both is only 0.33, and there is almost no color change and it cannot be visually recognized. Therefore, it can be seen that linear pattern 107 like wood grain is formed by the resin that flowed out from polypropylene insert piece 103 colored in brown.

According to such a configuration, wood-molded article 100 having the linear wood grain pattern, which has natural fluctuations like real wood, can be reproduced with the ordinary injection molding machine by the cellulosic fiber composite resin including 55% by mass of the cellulosic fiber and polypropylene insert piece 103.

Soft tree was used as the cellulosic fiber. In addition to this, any wood or plant that can extract the cellulosic fiber such as hardwood or bamboo can be used, and the material is not particularly limited.

Polypropylene is used as the base material of the cellulosic fiber composite resin, but the resin is not particularly limited as long as it can be converted into a composite resin within a range in which the cellulosic fiber is not carbonized at a pellet manufacturing stage.

As the resin insert piece, polypropylene equivalent to the base resin in which the cellulosic fiber is composited is used, but there is no particular limitation and is not limited. However, the resin with lower viscosity tends to have higher shearing force and calorific value than the injected resin, and in a case where a clearer thick linear wood grain pattern is desired, when the resin insert piece is melted, it is preferable to construct the resin insert piece with a material having a viscosity lower than that of the resin to be injected.

In a case where the resin insert piece is disposed directly in the location of the cavity to be the injection-molded article, the position and number thereof can be optionally set within a structurally possible range of the mold, and is not particularly limited.

EMBODIMENT 2

FIG. 4 is Table 1 illustrating manufacturing conditions and evaluation results thereof in a method for manufacturing an injection-molded article according to Embodiment 2. Table 1 illustrates investigation results of an injection molding limit and a formation limit of the linear pattern by changing the concentration of the cellulosic fiber in the cellulosic fiber composite resin.

In Table 1, Example 1 is a sample in which the cellulosic fiber composite resin examined in Embodiment 1 which uses the polypropylene as the base material and includes 10% by mass of the cellulosic fiber was molded under conditions of a resin temperature of 230° C. and a mold temperature of 80° C. Similar to Embodiment 1, the resin insert piece disposed in the mold was used by molding by adding 3% by mass of a brown colorant. Based on Example 1, the concentration of the cellulosic fiber was increased at intervals of 5% by mass, and the concentration of the cellulosic fiber capable of molding and the formation of the linear pattern were determined. The resin insert piece is not particularly changed under each condition.

In Table 1 of FIG. 4, in Examples 1 to 14 and Comparative Example 1, samples are obtained by molding a composite resin (5% by mass increment) in a range of 10% by mass to 80% by mass of the cellulosic fiber under conditions of a resin temperature of 230° C. and a mold temperature of 80° C. That is, Examples 1, 2, 3, 4, 5, 6, 7, 8, 9, 10, 11, 12, 13, and 14 are composite resins respectively including 10, 15, 20, 25, 30, 35, 40, 45, 50, 55, 60, 65, 70, and 75% by mass of the cellulosic fiber, and Comparative Example 1 is a composite resin including 80% by mass of the cellulosic fiber. Table 1 illustrates results of confirming a filling property and the linear pattern in the samples molded from these composite resins.

In Examples 1 to 14, the filling rate of the mold that defines the shape of the molded article was 100%, and there was no unfilled portion. Also, in the formation of the linear pattern, the formation was confirmed under all conditions, although there was a difference in width. In Table 1, this was evaluated as "good" and represented by "A".

On the other hand, in Comparative Example 1, the resin did not flow and fill up to the end of the mold. That is, it was not 100% filled. The formation of the linear pattern could not be confirmed because the viscosity was too high and there was a problem in the flow inside the mold. In Table 1, this was evaluated as "defective" and represented by "B". From the above, under the conditions described above, the composite resin including 75% by mass of the cellulosic fiber was the molding limit for obtaining a molded article satisfying the article shape by injection molding.

EMBODIMENT 3

Figure 6A:
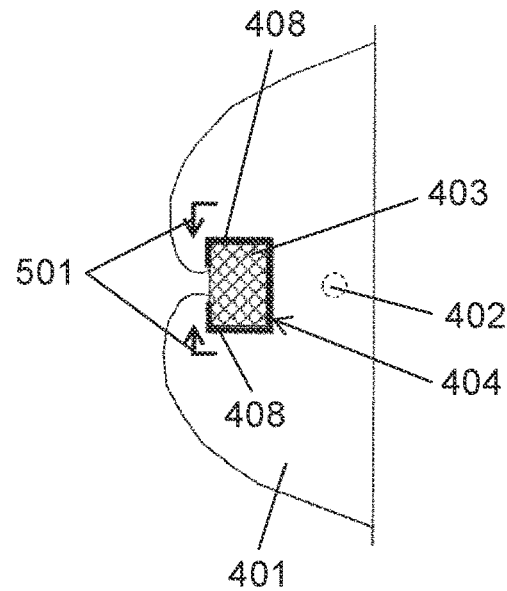
FIG. 6A is a schematic plan view illustrating how a cellulosic fiber composite resin from a gate branches on a front surface of a resin insert piece and wraps around a side surface thereof in Embodiment 3.
Figure 6B:
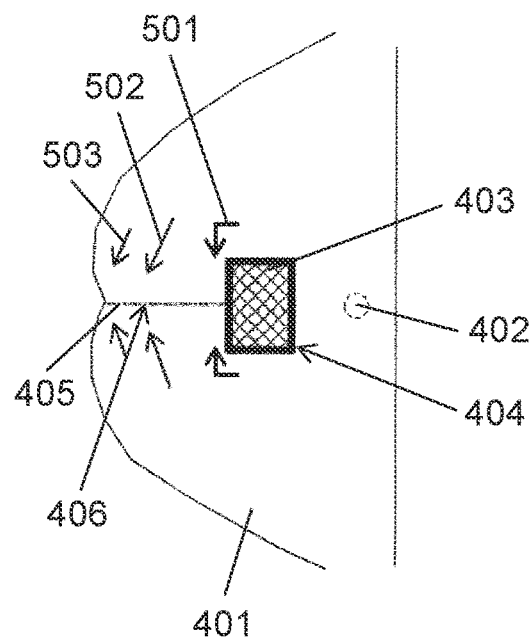
FIG. 6B is a schematic plan view illustrating a mechanism in which the cellulosic fiber composite resin that wrapped around after FIG. 6A elutes and merges the resin insert piece, and a pattern due to the eluted resin becomes linear.
Figure 7:
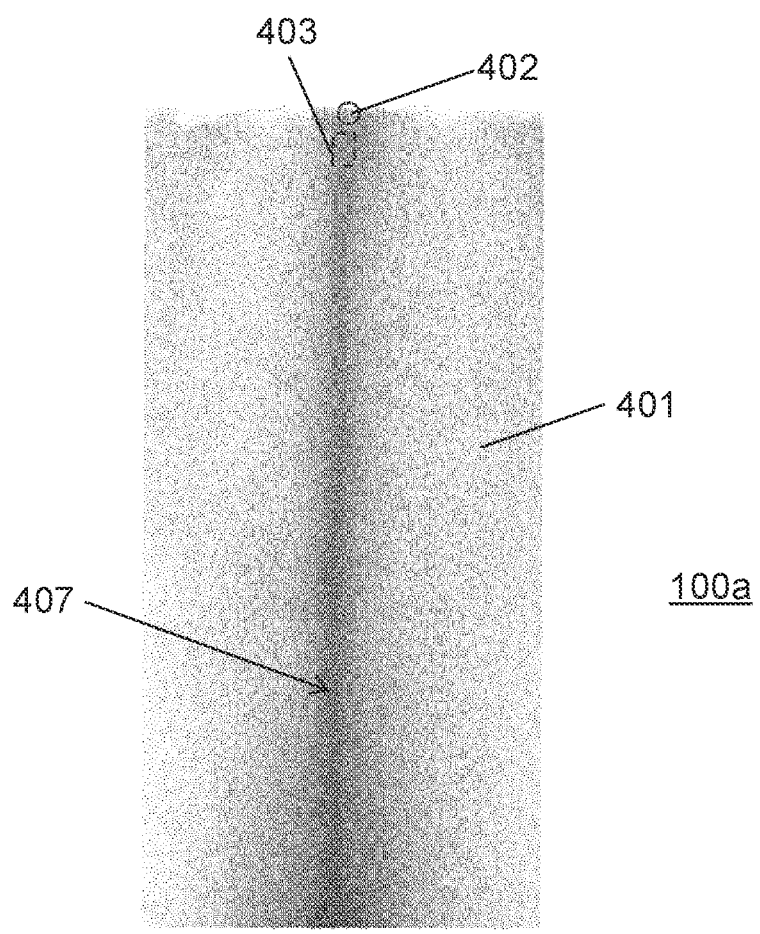
FIG. 7 is a schematic plan view illustrating an appearance of a molded article of a wood-molded article which is the injection-molded article of FIG. 5D.

FIGS. 5A to 5D are schematic perspective views illustrating each step of a method for manufacturing an injection-molded article according to Embodiment 3. FIG. 6A is a schematic plan view illustrating how cellulosic fiber composite resin 401 from gate 402 branches on a front surface of resin insert piece 403 and wraps around a side surface thereof in Embodiment 3. FIG. 6B is a schematic plan view illustrating a mechanism in which the cellulosic fiber composite resin that wrapped around after FIG. 6A elutes and merges resin insert piece 403, and pattern 405 becomes linear due to the eluted resin. FIG. 7 is a schematic plan view illustrating an appearance of the molded article of wood-molded article 100a which is the injection-molded article of FIG. 5D.

Injection-Molded Article

Wood-molded article 100a, which is the injection-molded article according to Embodiment 3, is an injection-molded article by using cellulosic fiber composite resin 401. As illustrated in FIG. 5D, wood-molded article 100a has resin insert piece 403 including a colorant or a cellulosic fiber, first region formed of cellulosic fiber composite resin 401, and second region 407 formed along weld line 406 of cellulosic fiber composite resin 401 extending from resin insert piece 403. Color tones of first region formed of the cellulosic fiber composite resin 401 and second region 407 are different.

Method for Manufacturing Injection-Molded Article

In a method for manufacturing an injection-molded article according to Embodiment 3, for example, cellulosic fiber composite resin 401 to which 55% by mass of the cellulosic fiber is added is used for injection molding. An examination was carried out by using resin insert piece 403 which was molded in the polypropylene to which 55% by mass of cellulosic fibers similar to the injection molding resin was added without being colored. Injection molding conditions at the time of injection are, for example, a resin temperature of 190° C., a mold temperature of 60° C., an injection speed of 100 mm/s, a holding pressure and holding time of 80 MPa and 5 s, and a mold temperature of 60° C.

(1) Resin insert piece 403 including the cellulose fiber is disposed in the cavity between molds (not illustrated) away from gate 402.

Figure 5A:
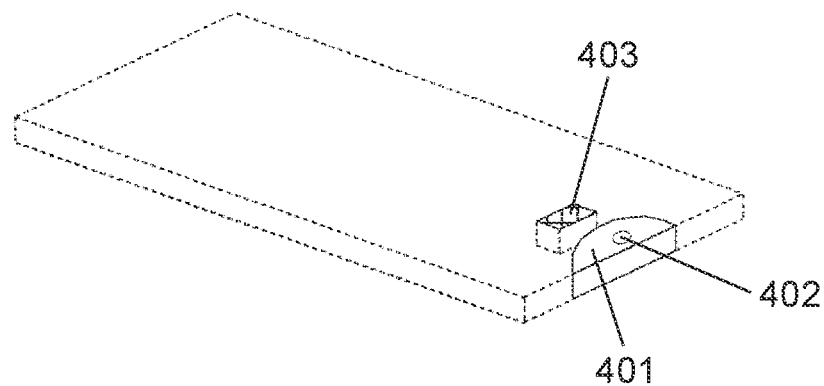
FIG. 5A is a schematic perspective view illustrating one step of a method for manufacturing an injection-molded article according to Embodiment 3.

(2) In FIG. 5A, cellulosic fiber composite resin 401 injected from a cylinder of a molding machine is injected into the cavity from gate 402 inside the mold.

Figure 5B:
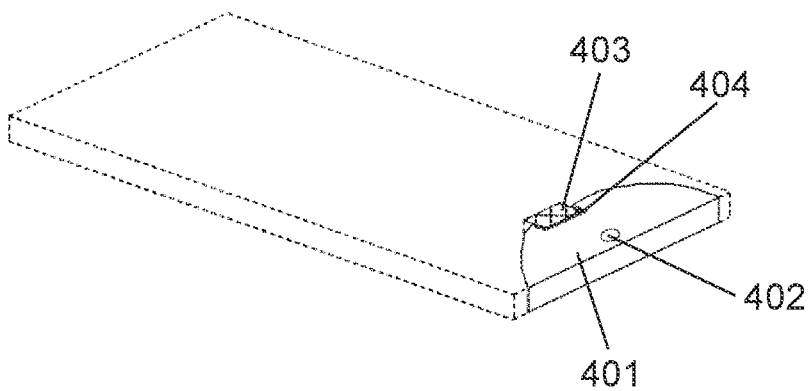
FIG. 5B is a schematic perspective view illustrating one step of the method for manufacturing an injection-molded article according to Embodiment 3.

(3) In FIG. 5B, resin insert piece 403 disposed at a position 5 mm from gate 402 is brought into a molten state by shear heat generation 404 by colliding with cellulosic fiber composite resin 401.

Figure 5C:
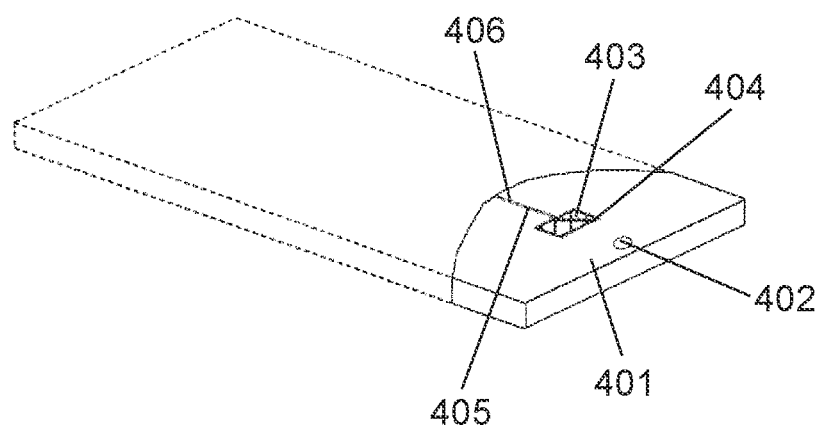
FIG. 5C is a schematic perspective view illustrating one step of the method for manufacturing an injection-molded article according to Embodiment 3.
Figure 5D:
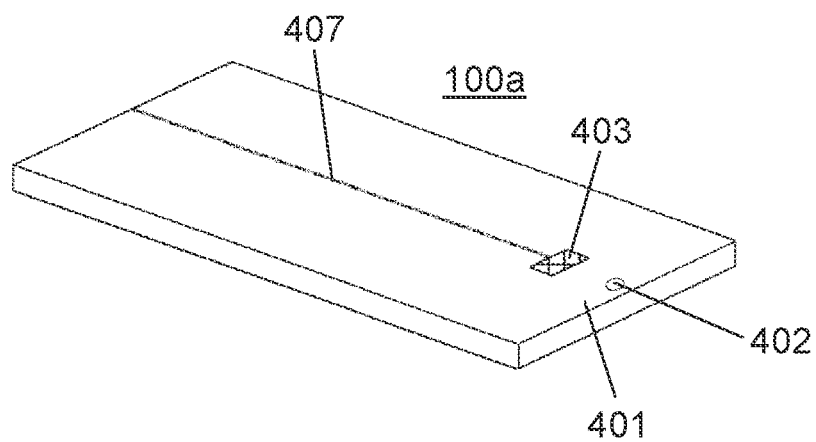
FIG. 5D is a schematic perspective view illustrating one step of the method for manufacturing an injection-molded article according to Embodiment 3.

(4) In FIG. 5C, cellulosic fiber composite resin 401 branches so as to avoid resin insert piece 403. Due to the shearing force at the time of this branching, a side wall of molten resin insert piece 403 elutes and flows out toward the flow end together with the resin flow. At this time, the cellulosic fiber included in resin 405 flowing out from resin insert piece 403 is in a semi-carbonized state due to the influence of the shear heat generation and turns to brown. Resin 405 including the browned cellulosic fiber elutes along weld line 406 formed by cellulosic fiber composite resin 401 that merged after branching with resin insert piece 403.

(5) In FIG. 5D, cellulosic fiber composite resin 401 flows while forming weld line 406, and the cavity is filled therewith at the flow end. At this time, resin insert piece 403 disposed at the position 5 mm from gate 402 constantly generates shear heat generation 404 and continues to generate a semi-carbonized component. Therefore, by continuing to elute resin 405 that flowed out from the side surface of resin insert piece 403 until it is filled at the flow end, brown linear pattern 407 is formed behind resin insert piece 403 in the flow direction.

As described above, wood-molded article 100a which is the injection-molded article having linear pattern 407 can be obtained.

Next, a mechanism for obtaining a linear pattern in the method for manufacturing an injection-molded article will be described with reference to FIGS. 6A and 6B.

a) As illustrated in FIG. 6A, cellulosic fiber composite resin 401 injected from gate 402 collides with resin insert piece 403 and then flows around resin insert piece 403 with shear heat generation 404, and inward flow 501 is generated at corners 408 of the resin insert piece 403.

b) As illustrated in FIG. 6B, cellulosic fiber composite resin 401 flowing around resin insert piece 403 merges, and after that, continuously receives inward forces 502 and 503 due to the influence of resin insert piece 403. As a result, resin 405 that flowed out from resin insert piece 403 due to the shear heat generation 404 flows so as to be constrained on weld line 406, and remains in the molded article like a linear pattern.

The cellulosic fiber included in resin 405 that flowed out from resin insert piece 403 due to the influence of shear heat generation 404 is constantly affected by the influence, and the semi-carbonized component is continuously generated, so that the linear pattern turns brown over an entire length.

As illustrated in FIG. 7, in wood-molded article 100a which is the injection-molded article of FIG. 5D, it can be confirmed that resin 405, which is eluted from cellulosic fiber composite resin insert piece 403 into a part of cellulosic fiber composite resin 401 and flows out while being semi-carbonized, flows to the flow end and linear pattern 407 is formed. Pattern 407 is linear pattern 407 which is basically linear style, but fluctuations occur in some places, and the texture is like a natural wood grain. A color difference between the cellulosic fiber composite resin insert piece disposed in the mold and the linear pattern formed by flowing out from the cellulosic fiber composite resin insert piece was calculated. Color difference ΔE representing a difference between the two colors in a Lab color display space can be obtained from the following equation.

$$\Delta E = \sqrt{(L_1^* - L_2^*)^2 + (a_1^* - a_2^*)^2 + (b_1^* - b_2^*)^2} = 21.3$$

From the results described above, color difference ΔE between both is as large as 21.3, and it can be seen that the color difference between the cellulosic fiber composite resin insert piece disposed in the mold and the resin flowing out from the cellulosic fiber composite resin insert piece is large. From this, it can be seen that the cellulosic fiber included in the outflowed resin is changed to the semi-carbonized component due to the influence of the shear heat generation, so that linear pattern 407 like wood grain is formed.

According to such a configuration, the linear wood grain pattern having natural fluctuation like real wood can be reproduced with the ordinary injection molding machine by the cellulosic fiber composite resin including 55% by mass of the cellulosic fiber and cellulosic fiber composite resin insert piece 403.

Soft tree was used as the cellulosic fiber. In addition to this, any wood or plant that can extract the cellulosic fiber such as hardwood or bamboo can be used, and the material is not particularly limited.

Polypropylene is used as the base material of the cellulosic fiber composite resin, but the resin is not particularly limited as long as it can be converted into a composite resin within a range in which the cellulosic fiber is not carbonized at a pellet manufacturing stage.

In a case where the resin insert piece is disposed directly in the location of the cavity to be the injection-molded article, the position and number thereof can be optionally set within a structurally possible range of the mold, and is not particularly limited.

EMBODIMENT 4

FIG. 8 is Table 2 illustrating manufacturing conditions and evaluation results thereof in a method for manufacturing an injection-molded article according to Embodiment 4. In Table 2, based on the results of Embodiment 2, the cellulosic fiber composite resin insert piece manufactured from a resin to which 75% by mass of moldable cellulosic fiber is added was disposed in the mold. As the injection resin, a possibility of forming the linear pattern was investigated by changing the concentration of the cellulosic fiber in the cellulosic fiber composite resin. Table 2 illustrates investigation results of the injection molding limit.

In Table 2, Example 15 is a sample in which the composite resin examined in Embodiment 3 which uses polypropylene as the base material and includes 10% by mass of the cellulosic fiber was molded under conditions of a resin temperature of 230° C. and a mold temperature of 80° C. The resin insert piece disposed in the mold is configured of the cellulosic fiber composite resin including 75% by mass of the cellulosic fiber as described above. Based on Example 15, the concentration of the cellulosic fiber was increased at intervals of 5% by mass, and the concentration of the moldable cellulosic fiber and the formation of the linear pattern were determined. The cellulosic fiber concentration of the cellulosic fiber composite resin insert piece is not particularly changed under each condition.

In Table 2 of FIG. 8, in Examples 15 to 28, samples are obtained by molding a composite resin (5% by mass increment) in a range of 10% by mass to 75% by mass of the cellulosic fiber under conditions of a resin temperature of 230° C. and a mold temperature of 80° C. That is, Examples 15, 16, 17, 18, 19, 20, 21, 22, 23, 24, 25, 26, 27, and 28 are composite resins respectively including 10, 15, 20, 25, 30, 35, 40, 45, 50, 55, 60, 65, 70, and 75% by mass of the cellulosic fiber. Table 2 illustrates the results of confirming the sample linear pattern molded from these composite resins.

In Examples 15 to 28, the formation of the linear pattern was confirmed under all conditions although there was a difference in width. In Table 1, this was evaluated as "good" and represented by "A". From the above, under the conditions described above, regardless of the concentration of the cellulosic fiber composite resin for injection with respect to the resin insert piece molded from the composite resin including 75% by mass of the cellulosic fiber, it can be seen that the linear pattern was formed without any problem. However, as the content of the cellulosic fiber of the injection resin was higher, the width and darkness of the linear pattern became thicker and darker, and the linear pattern was more prominently expressed. From this, in a case where it is desired to clarify the color difference, it is preferable that the contents of the injection resin and the cellulosic fiber of the resin insert piece are equal to each other, or the content of the cellulosic fiber of the resin insert piece is slightly low.

EMBODIMENT 5

Figure 9:
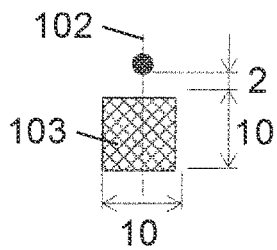
FIG. 9 is Table 3 illustrating a linear pattern in a case where a size of a resin insert piece and a positional relationship with a gate are changed in a method for manufacturing an injection-molded article according to Embodiment 5.
Figure 9:
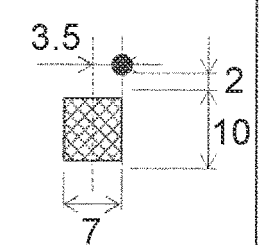
Figure 9:
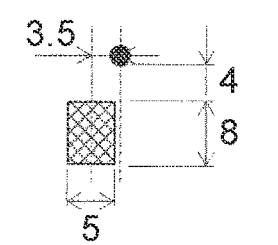
Figure 9:
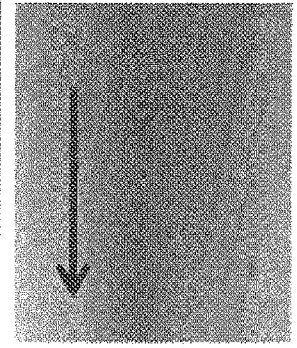
Figure 9:
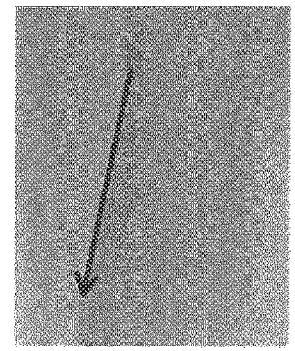
Figure 9:
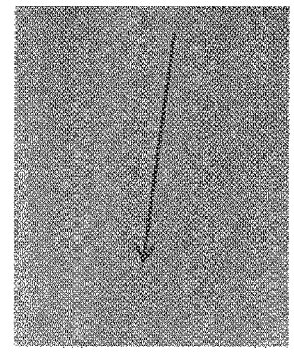
Figure 10A:
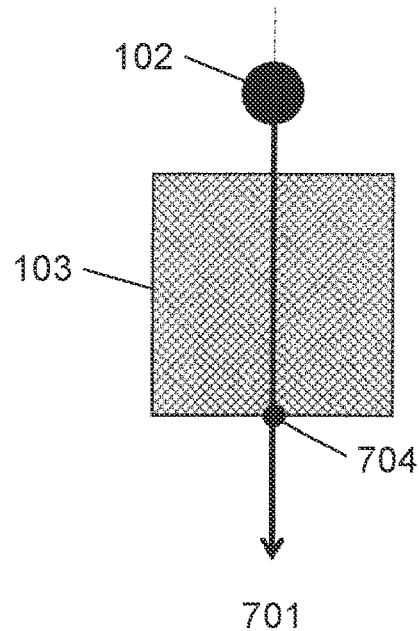
FIG. 10A is a schematic view illustrating a direction in which a linear pattern is formed in a case where a gate and a center of a resin insert piece overlap each other.
Figure 10B:
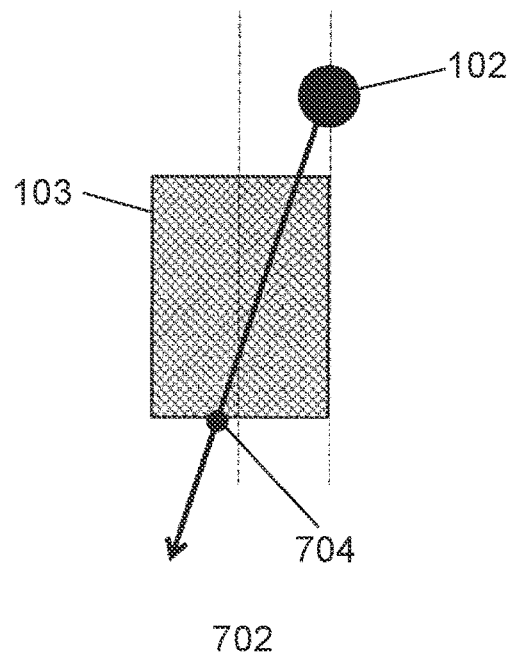
FIG. 10B is a schematic view illustrating a direction in which a linear pattern is formed in a case where the resin insert piece is disposed on a left side of the gate.
Figure 10C:
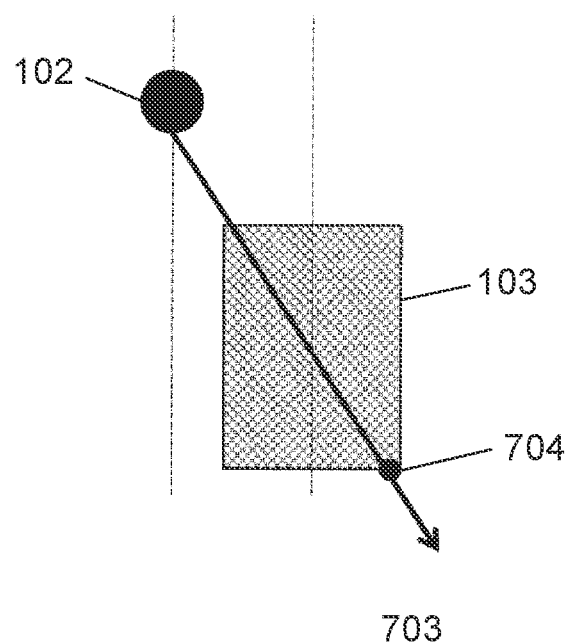
FIG. 10C is a schematic view illustrating a direction in which a linear pattern is formed in a case where the resin insert piece is disposed on a right side of the gate.

FIG. 9 is Table 3 illustrating a linear pattern in a case where a size of a resin insert piece and a positional relationship with a gate are changed in a method for manufacturing an injection-molded article according to Embodiment 5. FIG. 10A is a schematic view illustrating direction 701 in which a linear pattern is formed in a case where gate 102 and a center of resin insert piece 103 overlap each other. FIG. 10B is a schematic view illustrating direction 702 in which a linear pattern is formed in a case where resin insert piece 103 is disposed on a left side of gate 102. FIG. 10C is a schematic view illustrating direction 703 in which a linear pattern is formed in a case where resin insert piece 103 is disposed on a right side of gate 102.

In Embodiment 5, the direction, the width, and the length of the linear wood grain pattern formed by changing the size of resin insert piece 103 and the positional relationship with gate 102 were examined. In Embodiment 5, as in Embodiment 1, an examination was carried out by using the brown-colored polypropylene insert piece as the resin insert piece. The molding conditions at the time of injection are the same as those in Embodiment 1.

Table 3 of FIG. 9 is a table illustrating the results of investigating sizes of various resin insert pieces and the directions and the widths of the linear wood grain patterns formed at various positions with respect to gate 102 in Embodiment 5. FIGS. 10A to 10C are diagrams schematically illustrating directions 701 to 703 in which the linear wood grain patterns are formed in Embodiment 5.

In Table 3 of FIG. 9, Example 29 is an example in which 10 mm square resin insert piece 103 is centered at a position 2 mm away from gate 102. As a result, a linear wood grain pattern having a width of about 3 mm was formed relatively vertically.

On the other hand, as in Example 29, Example 30 is an example in which resin insert piece 103 having a size of 7 mm×10 mm is disposed at a position 2 mm away from gate 102 at a position offset to the left by 3.5 mm from the center. As a result, a linear wood grain pattern having a width of about 2.5 mm was formed diagonally downward to the left.

In Example 31, resin insert piece 103 was reduced to 5 mm×8 mm and the distance from gate 102 was increased to 4 mm as compared with that of Example 30. As a result, although the linear wood grain pattern was formed diagonally downward to the left as in Example 30, the width was about 1.5 mm, and an amount of outflowed resin 105 was reduced.

In FIGS. 10A to 10C, the directions 701, 702, and 703 of the linear pattern are arranged at different positions with respect to the gate 102, and are also different in size. From FIGS. 10A to 10C, it can be seen that directions 701, 702, and 703 in which the linear wood grain pattern is formed are determined by the positional relationship between gate 102 and resin merging point 704. That is, the linear wood grain pattern is formed from resin merging point 704 in the direction connecting the two points of gate 102 and resin merging point 704. The weld line extends along the direction connecting the two points of gate 102 and resin merging point 704. Each of the branched resins flows from the branch point along a periphery of resin insert piece 103. Therefore, resin merging point 704 may be simply calculated as a location where the lengths on both sides of the periphery of resin insert piece 103 are equal from the branch point.

According to such a configuration, it is possible to control the direction and the width of the linear wood grain pattern by controlling the disposition of resin insert piece 103 with respect to gate 102.

According to the process described above, in a case where it is desired to give the linear wood grain pattern diagonally downward to the right, it is possible to reproduce by disposing resin insert piece 103 on the right side with respect to the center of gate 102.

In Embodiment 5, the browned polypropylene insert piece was used for the resin insert piece, but as in Embodiment 3, a similar linear pattern can also be obtained by using the cellulosic fiber composite resin insert piece including the cellulosic fiber.

EMBODIMENT 6

Figure 11A:
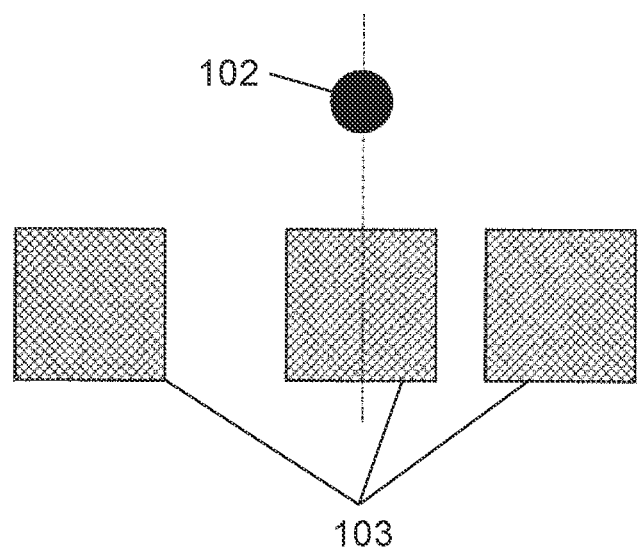
FIG. 11A is a schematic view illustrating an example in a case where a plurality of resin insert pieces are disposed for one gate in a method for manufacturing an injection-molded article according to Embodiment 6.
Figure 11B:
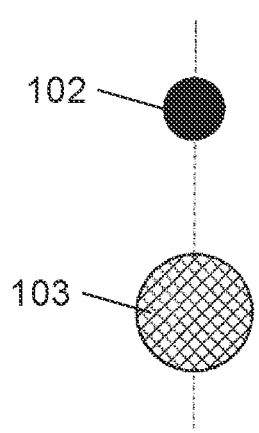
FIG. 11B is a schematic view illustrating an example in a case where the resin insert piece is a circle.
Figure 11C:
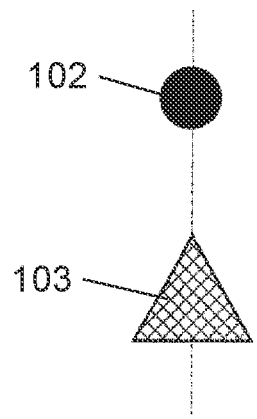
FIG. 11C is a schematic view illustrating an example in a case where the resin insert piece is a triangle.
Figure 11D:
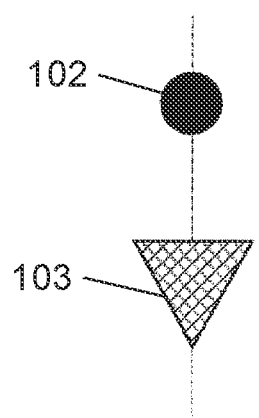
FIG. 11D is a schematic view illustrating an example in a case where the resin insert piece is an inverted triangle.

FIG. 11A is a schematic view illustrating an example in a case where a plurality of resin insert pieces 103 are disposed for one gate 102 in a method for manufacturing an injection-molded article according to Embodiment 6. FIG. 11B is a schematic view illustrating an example in a case where the resin insert piece is a circle. FIG. 11C is a schematic view illustrating an example in a case where the resin insert piece is a triangle. FIG. 11D is a schematic view illustrating an example in a case where the resin insert piece is an inverted triangle.

In Embodiment 6, the shape and quantity of resin insert piece 103 with respect to gate 102 were examined.

As illustrated in FIG. 11A, in a case where a plurality of resin insert pieces 103 are provided, linear patterns can be formed in directions connecting gate 102 and the resin merging points of respective resin insert pieces 103.

According to this configuration, it is possible to form a plurality of linear wood grain patterns from single gate 102, and the direction of the linear wood grain can be optionally controlled by changing the interval and the distance of each insert piece.

FIGS. 11B to 11D illustrate examples in which resin insert pieces 103 are respectively made into the circle, the triangle, and the inverted triangle.

According to such a configuration, it is possible to impart the linear wood grain pattern as those in Embodiments 1 and 2, and the shape of resin insert piece 103 can be optionally set according to the mold structure and the article shape.

EMBODIMENT 7

Method for Manufacturing Injection-Molded Article

FIGS. 12A to 12D are schematic perspective views illustrating each step of a method for manufacturing an injection-molded article according to Embodiment 7.

Compared with the method for manufacturing an injection-molded article according to Embodiment 1, the method for manufacturing an injection-molded article according to Embodiment 7 is different in that resin insert piece 903 is disposed at a location outside the same product away from tab gate 902 which is outside the product portion. As a result, tab gate 902 and resin insert piece 903 can be separated from the injection-molded article.

In Embodiment 7, for example, an examination was carried out by using cellulosic fiber composite resin 901 to which 55% by mass of the cellulosic fiber is added for injection molding, and using resin insert piece 903 which is molded by dry-blending a brown colorant with polypropylene which is the base resin. Molding conditions at the time of injection are, for example, a resin temperature of 200° C., a mold temperature of 60° C., an injection speed of 100 mm/s, and a holding pressure and holding time of 80 MPa and 5 s.

(1) Resin insert piece 903 including a colorant is disposed away from tab gate 902 outside the product portion of the cavity between the molds (not illustrated).

Figure 12A:
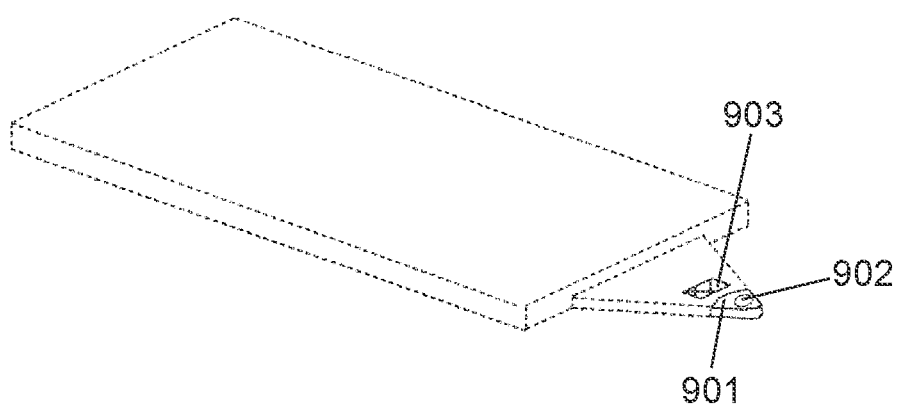
FIG. 12A is a schematic perspective view illustrating one step of a method for manufacturing an injection-molded article according to Embodiment 7.

(2) In FIG. 12A, resin insert piece 903 is disposed in the vicinity of tab gate 902 outside the product portion. Cellulosic fiber composite resin 901 injected from the cylinder of the molding machine is injected from tab gate 902 inside the mold.

Figure 12B:
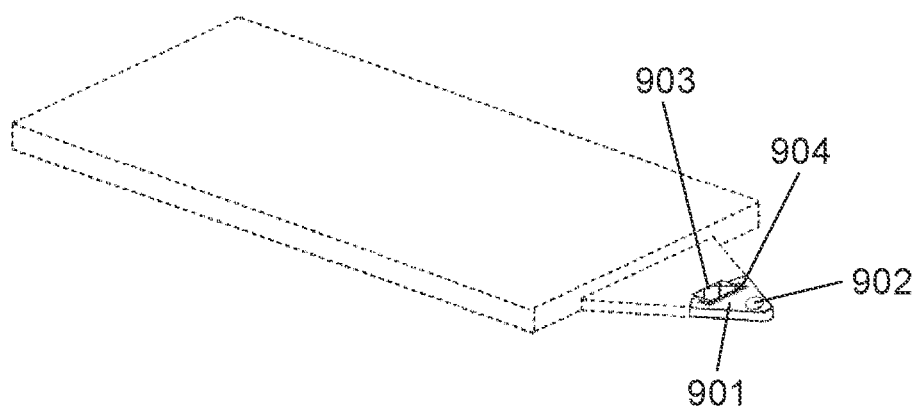
FIG. 12B is a schematic perspective view illustrating one step of the method for manufacturing an injection-molded article according to Embodiment 7.

(3) In FIG. 12B, resin insert piece 903 disposed at a position 10 mm from tab gate 902 is in a molten state due to shear heat generation 904 by colliding with the cellulosic fiber composite resin 901.

Figure 12C:
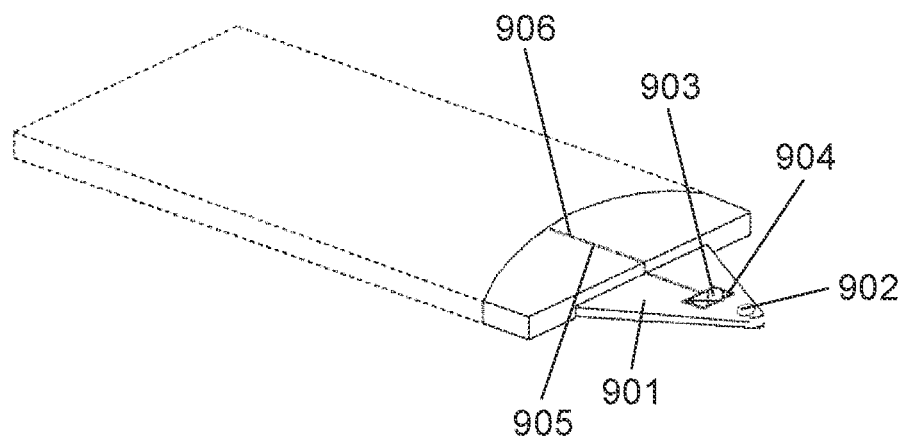
FIG. 12C is a schematic perspective view illustrating one step of the method for manufacturing an injection-molded article according to Embodiment 7.

(4) In FIG. 12C, cellulosic fiber composite resin 901 branches so as to avoid resin insert piece 903. Due to the shearing force at the time of the branching, a side wall of molten resin insert piece 903 elutes and flows out toward the flow end together with the resin flow. At this time, resin 905 that flowed out from resin insert piece 903 elutes along weld line 906 formed by cellulosic fiber composite resin 901 that merged after branching with resin insert piece 903.

Figure 12D:
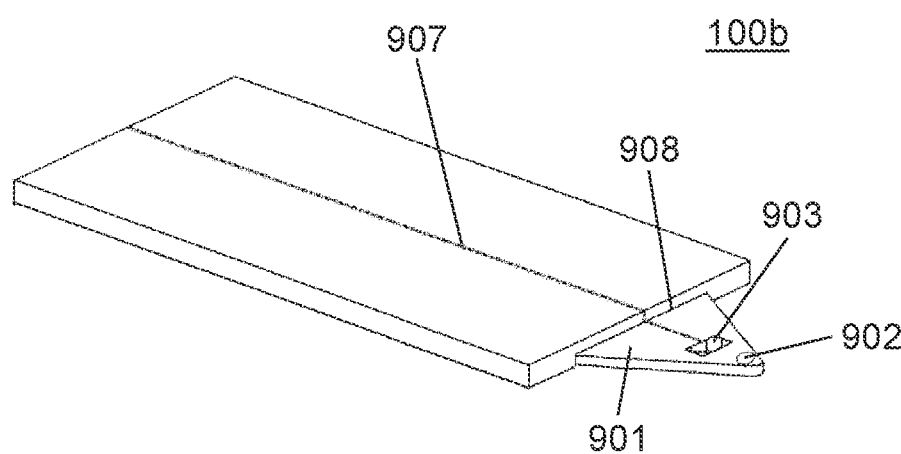
FIG. 12D is a schematic perspective view illustrating one step of the method for manufacturing an injection-molded article according to Embodiment 7.

(5) In FIG. 12D, cellulosic fiber composite resin 901 flows while forming weld line 906, and the cavity is filled therewith at the flow end. At this time, resin insert piece 903 disposed at a position 10 mm from tab gate 902 constantly generates shear heat generation 904. Therefore, by continuing to elute the resin 905 that flowed out from the side surface of resin insert piece 903 until the flow end is filled therewith, linear pattern 907 is formed behind resin insert piece 903 in the flow direction.

(6) After the molding is completed, the tab gate is separated at boundary surface 908 between the product portion and the tab gate.

As described above, wood-molded article 100b, which is an injection-molded article having linear pattern 907, can be obtained.

According to such a configuration, it is possible to obtain wood-molded article 100b which is an injection-molded article having the linear wood grain pattern without leaving tab gate 902 and resin insert piece 903 in the product portion.

The number, the interval, and the shape of the resin insert pieces to be disposed as being examined in Embodiment 3 can be optionally set within a range in which the resin insert piece can be disposed in the mold, and are not particularly limited.

In Embodiment 7, the browned polypropylene insert piece was used for the resin insert piece, but as in Embodiment 3, even if the cellulosic fiber composite resin insert piece including the cellulosic fiber is used, the same linear pattern can be obtained.

EMBODIMENT 8

Method for Manufacturing Injection-Molded Article

Figure 13:
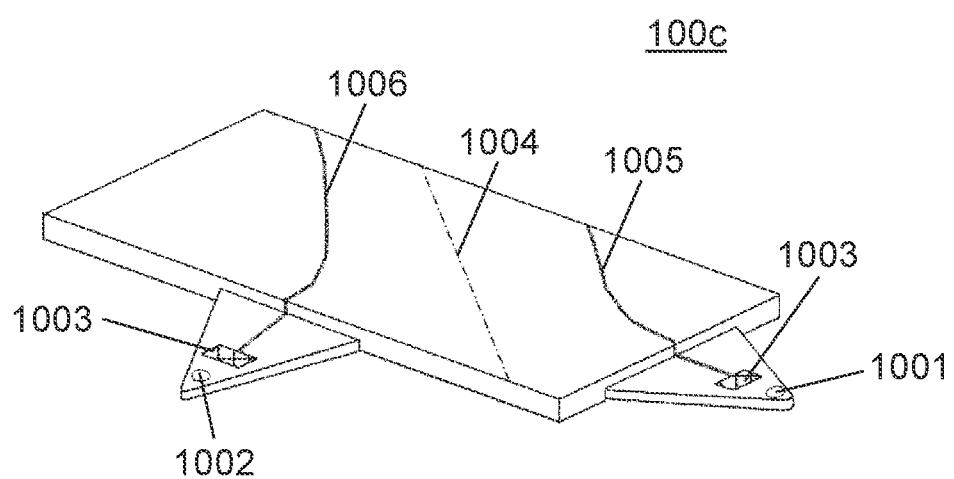
FIG. 13 is a schematic perspective view illustrating an appearance of an injection-molded article obtained by a method for manufacturing an injection-molded article according to Embodiment 8.

FIG. 13 is a schematic perspective view illustrating an appearance of an injection-molded article obtained by a method for manufacturing an injection-molded article according to Embodiment 8.

Compared with the method for manufacturing an injection-molded article according to Embodiment 7, the method for manufacturing an injection-molded article according to Embodiment 8 is different in that a plurality of tab gates 1001 and 1002 are disposed and a mold structure that gives a significant fluctuation to the linear wood grain pattern is used.

In FIG. 13, tab gates 1001 and 1002 are in a positional relationship rotated by 90° each other. In the mold having this configuration, resin insert pieces 1003 are respectively disposed in any shapes and positions in the vicinity of two tab gates 1001 and 1002. By injection molding from each of tab gates 1001 and 1002, the flow direction of the resin changes at resin merging interface 1004 where the resins from two tab gates 1001 and 1002 merge, and large fluctuations 1005 and 1006 can be imparted to the linear wood grain pattern.

According to such a configuration, by disposing a plurality of tab gates at any angle in the mold, it is possible to impart the linear wood grain pattern having large fluctuations.

This configuration is not effective only for the tab gate, and can be reproduced with various gate shapes such as the direct gate and the pin gate examined in Embodiments 1 and 3, and is not particularly limited.

A multi-point gate and a plurality of resin insert pieces are disposed, and injection timing from each gate is different, so that an injection speed may be stepped, or an angle may be provided in the gate disposition. Thereby, various fluctuations can be imparted to the wood grain in the wood grain-like linear pattern formed on the weld line of the resin to be injected by the method for manufacturing an injection-molded article according to each of the embodiments described above.

Even in a case where the wood grain-like linear pattern is expressed by the method described above, the shear heat generation and the shearing force generated in the resin insert piece can be changed by increasing or decreasing the injection speed. As a result, the wood grain-like linear pattern can be thickened by injecting at high speed, and the linear pattern can be thinned by injecting at low speed. This makes it possible to control the width and the direction of each wood grain.

The present disclosure includes an appropriate combination of any embodiment and/or example of the various embodiments and/or examples described above, and the effects of each of embodiments and/or examples can be achieved.

The wood-molded article, which is the injection-molded article according to the present disclosure, can reproduce the texture and the wood grain pattern of real wood in the same cycle as that of the injection molding. Therefore, the present disclosure can be applied to a component that cannot be used for real wood, such as replacement of a product that is applied in a cutting process of wood for a long time, and water supply in which wood is difficult to use due to durability problem.

What is claimed is:

1. An injection-molded article containing a cellulosic fiber composite resin, the injection-molded article comprising:
    a resin insert piece including a colorant or a cellulose fiber, the resin insert piece being disposed in a cavity between molds;
    a first region formed of the cellulosic fiber composite resin; and
    a second region formed along a weld line of the cellulosic fiber composite resin extending from the resin insert piece,
    wherein the first region and the second region have different color tones.

2. The injection-molded article of claim 1,
    wherein the second region has a width narrower than a width of the first region and has a continuous linear pattern.

3. The injection-molded article of claim 1,
    wherein the weld line contains a part of the cellulosic fiber composite resin, in which a flow of the cellulosic fiber composite resin from a gate trace formed at a time of injection molding is hindered by the resin insert piece to cause branching and merging.

4. The injection-molded article of claim 1,
    wherein the second region is colored by a colorant.

5. The injection-molded article of claim 1,
    wherein the second region includes a cellulosic fiber.

6. The injection-molded article of claim 1,
    wherein the injection-molded article includes one gate trace formed at the time of injection molding and a plurality of resin insert pieces, and has a plurality of second regions extending from the plurality of resin insert pieces.

7. The injection-molded article of claim 1,
    wherein the injection-molded article includes a plurality of gate traces formed at the time of injection molding and a plurality of resin insert pieces, and has a plurality of second regions extending from the plurality of resin insert pieces, and a direction of the weld line forming the second region is at least one of a direction along an injection direction of the cellulosic fiber composite resin and a merging direction of the cellulosic fiber composite resin from the plurality of gate traces.

8. The injection-molded article of claim 1,
    wherein the resin insert piece is disposed along a central axis of the injection-molded article in a longitudinal direction.

* * * * *